W. CAMPBELL.
ELECTRIC FIRELESS COOKER.
APPLICATION FILED DEC. 5, 1921.

1,416,263. Patented May 16, 1922.

Inventor
William Campbell,
By
Attorney

UNITED STATES PATENT OFFICE.

WILLIAM CAMPBELL, OF DETROIT, MICHIGAN.

ELECTRIC FIRELESS COOKER.

1,416,263.   Specification of Letters Patent.   Patented May 16, 1922.

Application filed December 5, 1921. Serial No. 519,976.

*To all whom it may concern:*

Be it known that I, WILLIAM CAMPBELL, a citizen of the United States of America, residing at Detroit, in the county of Wayne and State of Michigan, have invented certain new and useful Improvements in Electric Fireless Cookers, of which the following is a specification, reference being had therein to the accompanying drawings.

This invention relates to cookers and more particularly to such devices wherein the cooking is done in a closed and insulated chamber and heat is furnished by an electric heater placed in the chamber.

The object of the invention is to provide very simple and efficient means for automatically opening the electric circuit of the heater to control the heat, and to so arrange such means that its operation will be governed by the kind of material cooked or heated in the chamber. A further object is to provide certain other new and useful features whereby other advantages are gained in the construction and operation of the cooker, all as hereinafter more fully described.

Figure 1:
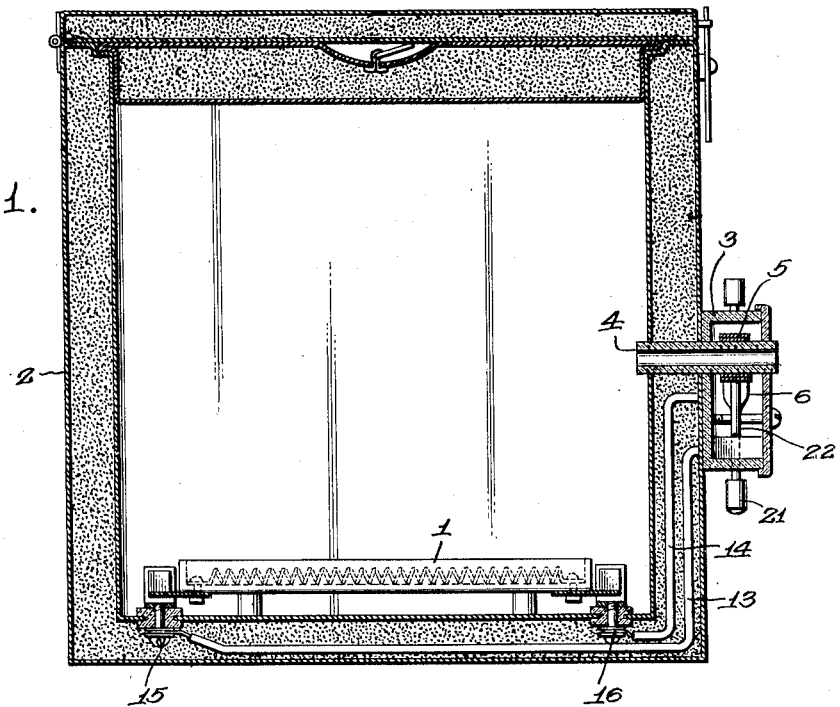
Figure 2:
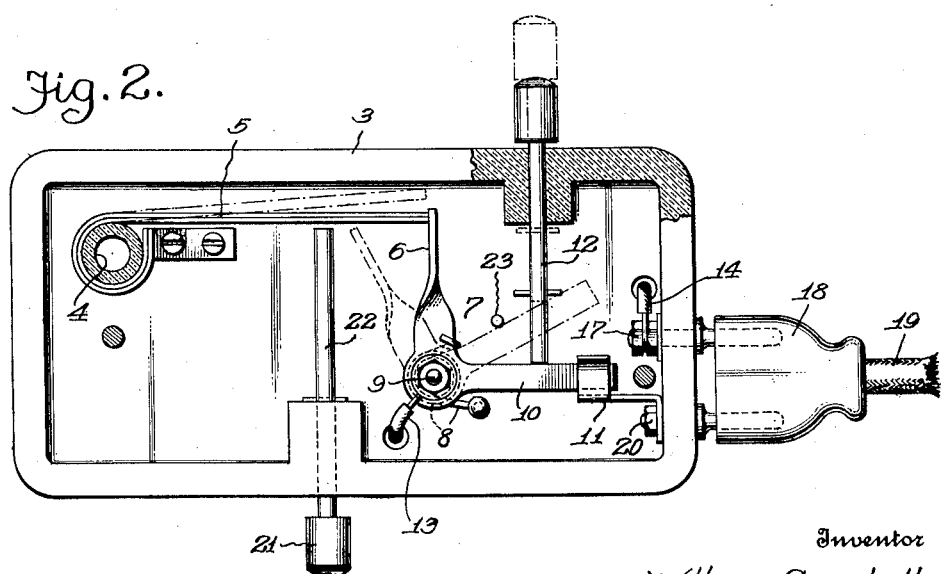

With the above and other ends in view, the invention consists in the matters hereinafter set forth and more particularly pointed out in the appended claims, reference being had to the accompanying drawings in which Figure 1 is a transverse vertical section through an insulated compartment or chamber and showing an electric heater therein and controlling means illustrative of the invention in operative position thereon; and Fig. 2 is an enlarged longitudinal vertical section through the controlling means.

All materials cooked or heated contain more or less moisture and when heated, this moisture passes off in the form of steam or vapor. The larger the body of material, the slower will be the process of converting this moisture into steam, and steam will not be rapidly generated until the body of material has been thoroughly heated all the way through. By retaining this heat, as in an insulated chamber, the cooking of the material will continue after the generation of further heat is discontinued, and the material will therefore, regardless of its bulk, be thoroughly cooked by the initial heat, or the heat required to bring the entire body to a temperature which will rapidly convert the moisture therein into steam or vapor. The generation of heat may therefore be controlled by the steam generated in cooking to effect the cutting off of the current at the proper time, which in each instance will be when the heat becomes sufficient to rapidly generate steam.

To effect the cutting off of the current to the electric heater 1 which is positioned within an insulated chamber or box 2 of any suitable construction having walls which are spaced apart with an insulating material between, a suitable switch mechanism is placed within an electrically insulated casing 3 upon the outer side of the box 2 with a conduit 4 extending through the wall of the box or chamber and through said casing, around which conduit is wrapped a thermostatic or temperature responsive element 5 with a free extended end of said element arranged to be engaged by an arm 6 of a rotary switch 7 which is pivoted in the casing 3 and actuated in one direction of the turning movement by a spring 8 coiled about the pivot bolt 9 of the switch. A second arm 10 of this switch is adapted to engage a terminal member 11 when the switch is turned against the action of the spring 8 by means of a push rod 12 extending through the top of the casing and provided with a push button on its outer end, its inner end engaging the upper side of the arm 10 at a distance from the switch pivot, so that an inward push upon this rod will rotate the switch, bringing the arm 10 into contact with the terminal 11 and the arm 6 into engagement with the free end of the thermostatic or temperature responsive element 5 which is shown as in the form of two thin flat strips of metal, the contacting faces of which are welded or otherwise firmly united and the metals of which the strips are formed having different expansive qualities under the influence of heat, so that when the conduit 4 is heated by the passage of steam therethrough and this heat is transmitted to that portion of the strips which are wrapped about the conduit, the difference in expansion of the two strips will cause the free end of the element to move upwardly, disengaging said end from the switch arm 6 and permitting the spring 8 to turn the switch to open position with the arm 10 out of engagement with the terminal member 11.

Wires 13 and 14 lead from the terminals 15 and 16 respectively, of the heater 1 to the casing 3 with the wire 13 electrically connected to the pivot or stud 9 of the switch 7 and the wire 14 connected to a terminal 17 on the casing to which one of the wires of an electric circuit is connected in any convenient manner, as by a socket 18 secured to the end of a cable 19 carrying the circuit wires leading from any suitable source of current (not shown), such as an electric lighting circuit. The other wire of the circuit is connected by the socket 18 to a terminal 20 on the casing, to which terminal the terminal or contact member 11 is electrically connected.

When the switch 7 is closed by pressing inward upon the push rod 12, an electric circuit is established from the leading-in wire through the terminal 20, contact 11, switch arm 10, wire 13, heating element 1 and out through the wire 14 and terminal 17 to the other wire contained in the cable 19.

As soon as sufficient heat is generated in the closed and insulated compartment 2 to cause the rapid generation of steam, this steam, in passing out through the conduit 4 which is open to the atmosphere and is the only outlet from the chamber, will heat the conduit and thermostatic element 5 in contact therewith sufficiently to cause said element to deflect and disengage its free end from engagement with the arm 6 of the switch which switch will at once snap to open position, breaking the heater circuit and stopping the further generation of heat.

The length of time that the heat will be generated is therefore controlled by the generation of steam in the chamber 2, and this generation of steam is controlled directly by the kind and bulk of material placed in the chamber to be cooked or heated, the device therefore becomes automatic in its operation and all foods placed in the chamber will be thoroughly cooked without attention on the part of the operator. As the container or chamber 2 is tightly closed with the exception of the single small passage, tube or conduit 4 and insulated against heat radiation, loss of heat is minimized and the material will retain the heat and continue to cook until thoroughly done, after the current is automatically turned off, thus minimizing current consumption and making the cooking or heating operation automatic.

Should it be found desirable to cut off the current prior to the automatic operation of the switch 7, said switch may be operated to open it, by pressing inward upon a push button 21 carried by the outer end of a push rod 22 passing through the bottom of the casing 3 and extending upward therein with its inner end adjacent the lower side of the free end portion of the thermostatic element 5 to disengage said end from the arm 6 of the switch. A stop 23 may also be provided in the casing 3 to limit the turning movement of the switch when turned to open position by its spring 8.

By this arrangement the cooking chamber 2 may be tightly closed except for the very small tube or conduit 4 through which the steam is permitted to escape directly into the atmosphere, and the steam is therefore retarded in its escape and the opening of the switch retarded until such time as the chamber and its contents becomes sufficiently heated to generate steam rapidly, causing a steam pressure in the chamber which will force a flow of hot steam through the small conduit sufficient to heat the thermostatic element and cause it to operate to release the switch.

A simple device which is automatic and efficient in its operation is therefore secured and the switch and its operating mechanism is positioned outside the insulated container or chamber where it will not be affected by the moisture and where it is very accessible for replacement or repair. It is also obvious that as the outlet conduit 4 passes through the casing 3 and opens directly into the atmosphere, and as said conduit is not restricted, when sufficient steam pressure has been generated to cause it to flow rapidly through the conduit, the steam will not be retarded in the conduit to cause condensation therein and interfere with its being heated but will be rapidly heated by the flow of hot steam therethrough to operate the switch upon the temperature of the contents of the container reaching the necessary point to do the cooking.

Changes in the form, construction and arrangement of parts are contemplated within the scope of the appended claims and I do not, therefore, limit myself to the particular construction shown.

Having thus fully described my invention, what I claim is:—

1. The combination with a closed chamber and heating means for said chamber, of a conduit leading from said chamber and open at its outer end to the atmosphere, and temperature responsive means out of the path of the heated fluid passing through said conduit for regulating said heating means.

2. The combination with a closed chamber and heating means for said chamber, of a conduit leading from said chamber and open at its outer end to the atmosphere, and temperature responsive means outside said conduit to which heat is transmitted by said conduit from fluid passing therethrough, said means being arranged to control said heating means.

3. The combination with a closed chamber and heating means for said chamber, of a conduit leading from said chamber and open at its outer end to the atmosphere, a temperature responsive element contacting said conduit, and means controlled by said element for regulating said heating means.

4. The combination with a closed chamber, an electric heater for said chamber, and an electric circuit for said heater, of a conduit leading from said chamber to the atmosphere, a temperature responsive element operated by heat imparted by fluid passing through said conduit, and means controlled by said element for interrupting said circuit.

5. The combination of a closed and insulated heating chamber, means for supplying heat to said chamber to produce steam by the heating of material placed in the chamber to be cooked or heated, an open passage leading from said chamber to the atmosphere through which the generated steam is free to flow, and controlling means for said heating means including a thermostatic element located outside said passage and operated by heat imparted to the passage by the steam escaping therethrough.

6. The combination of a closed and insulated heating chamber, an electric heater within said chamber, a circuit for said heater, a casing outside the insulated chamber, a conduit extending through a wall of the chamber and through said casing with its inner end opening into the chamber and its outer end open to the atmosphere, and controlling means within the electric circuit located within said casing and including a temperature responsive element adapted to be affected by the heat of a fluid passing through said conduit.

7. The combination with a closed chamber, an electric heater within said chamber and an electric circuit for said heater, of a tubular conduit of uniform diameter extending through the wall of the chamber with its inner end opening into the chamber and its outer end open to the atmosphere, and means for interrupting the electric circuit including a temperature responsive element embracing said conduit.

8. The combination with a closed and insulated heating chamber, an electric heater for said chamber, and an electric circuit for said heater, of a tubular conduit extending through a wall of the chamber with its outer end open to the atmosphere and a circuit controlling means including a temperature responsive element comprising strips of metal having different expansive qualities encircling said tubular conduit.

9. The combination with a closed and insulated heating chamber, an electric heater in said chamber, an electric circuit for said heater, of a tubular conduit extending through the wall of the chamber with its outer end open to the atmosphere, a casing surrounding the outer end portion of the tubular conduit, an electric switch for said circuit within said casing, and controlling means for said switch comprising a temperature responsive element to which heat from fluid passing through the conduit is transmitted thereto by said conduit.

In testimony whereof I affix my signature in presence of two witnesses.

WILLIAM CAMPBELL.

Witnesses:
Lewis E. Flanders,
Karl H. Butler.